(12) United States Patent
Yadhav et al.

(10) Patent No.: US 11,166,209 B2
(45) Date of Patent: Nov. 2, 2021

(54) METHODS AND SERVICE NODES FOR TRANSFERRING A SERVICE SESSION FOR A WIRELESS DEVICE BETWEEN SERVICE NODES ASSOCIATED TO DIFFERENT BASE STATIONS

(71) Applicant: Telefonaktiebolaget LM Ericsson (publ), Stockholm (SE)

(72) Inventors: Vinay Yadhav, Upplands Väsby (SE); Jonas Pettersson, Luleå (SE); Amir Roozbeh, Kista (SE); Johan Rune, Lidingö (SE)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 92 days.

(21) Appl. No.: 16/499,742

(22) PCT Filed: Apr. 21, 2017

(86) PCT No.: PCT/SE2017/050394
§ 371 (c)(1),
(2) Date: Sep. 30, 2019

(87) PCT Pub. No.: WO2018/194498
PCT Pub. Date: Oct. 25, 2018

(65) Prior Publication Data
US 2021/0099929 A1    Apr. 1, 2021

(51) Int. Cl.
*H04W 36/02*  (2009.01)
*H04L 29/08*  (2006.01)
*H04W 36/08*  (2009.01)

(52) U.S. Cl.
CPC ......... *H04W 36/023* (2013.01); *H04L 67/148* (2013.01); *H04W 36/08* (2013.01)

(58) Field of Classification Search
CPC .... H04W 36/023; H04W 36/08; H04L 67/148
See application file for complete search history.

(56) References Cited

U.S. PATENT DOCUMENTS

2005/0078645 A1* 4/2005 Hamadi ............... H04W 88/06
                                                                370/338
2014/0204819 A1* 7/2014 Ohta .................... H04W 72/085
                                                                370/311
(Continued)

FOREIGN PATENT DOCUMENTS

EP         2742954 A1    7/2012
WO    2011032732 A1    3/2011
WO    2015084230 A1    6/2015

OTHER PUBLICATIONS

International Search Report and Written Opinion for Application No. PCT/SE2017/050394, dated Oct. 20, 2017, 14 pages.
(Continued)

*Primary Examiner* — Charles C Jiang
*Assistant Examiner* — Shawn D Miller
(74) *Attorney, Agent, or Firm* — NDWE LLP

(57) ABSTRACT

Source and target service nodes and methods are described for transferring a service session for a wireless device from the source node to the target node when a service application is executed in the source node for the wireless device by the service session. In particular, the amount of application data to be transferred from the source node to the target node for a wireless device that is handed over from a first base station to a second base station can be reduced by truncating the application data by an amount corresponding to the data pending in a downlink buffer at the first base station. Thereby, the target node is able to recreate the complete application buffer from the truncated application data and data from the downlink buffer, the latter data being trans- (Continued)

ferred from the first base station (206) to the second base station (208), according to a handover procedure.

26 Claims, 6 Drawing Sheets

(56) References Cited

U.S. PATENT DOCUMENTS

| | | |
|---|---|---|
| 2014/0286254 A1 | 9/2014 | Agiwal et al. |
| 2016/0255543 A1 | 9/2016 | Yadhav et al. |
| 2017/0359848 A1* | 12/2017 | Tenny .................. H04W 64/00 |

OTHER PUBLICATIONS

International Search Report and Written Opinion for Application No. PCT/SE2017/050393, dated Dec. 21, 2017, 10 pages.

Nokia et al., "Solution for Session Continuity" 3GPP Draft; S2-162527—Sessioncontinuity, 3rd Generation Partnership Project (3GPP), Mobile Competence Centre, vol. SA WG2, Nanjing, P.R. China; May 23, 2016-May 27, 2016, May 23, 2016 (May 23, 2016), XP051109285, Retrieved from the Internet: URL:http://www.3gpp.org/ftp/Meetings_3GPP_SYNC/SA2/Docs/ [retrieved on May 23, 2016], Paragraph 11 "Scenario 311".

\* cited by examiner

METHODS AND SERVICE NODES FOR TRANSFERRING A SERVICE SESSION FOR A WIRELESS DEVICE BETWEEN SERVICE NODES ASSOCIATED TO DIFFERENT BASE STATIONS

CROSS-REFERENCE TO RELATED APPLICATIONS

This application is a National stage of International Application No. PCT/SE2017/050394, filed Apr. 21, 2017, which is hereby incorporated by reference.

TECHNICAL FIELD

The present disclosure relates generally to a source service node, a target service node and methods therein, for transferring a service session for a wireless device from the source service node to the target service node.

BACKGROUND

In this disclosure, the term "wireless device" is used to represent any communication entity capable of radio communication with a network node of a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which could be used herein as a synonym for wireless device.

The wireless network typically comprises a number of network nodes which are operable to communicate radio signals with wireless devices over a radio interface. Depending on the type of network and terminology used, a network node of a wireless network may be referred to as a base station, radio node, Node B, eNodeB, base transceiver station, access point, etc. In this disclosure, the term "base station" is used to represent such a network node without limitation to any particular type of wireless network.

Further, the term "service node" is used herein to represent any functional network entity that is operable to provide one or more service sessions for a wireless device by sending application data to the wireless device via a base station of a wireless network. Such application data may be related to any services that can be provided for wireless devices, e.g. streaming or downloading of various media content such as music, images, movies, web pages and gaming, although this disclosure is not limited to any particular application data. This communication of data to a wireless device may typically involve considerable amounts of data that is first generated or otherwise obtained at the service node and then sent to the base station currently serving the wireless device for transmission over a radio interface between the base station and the wireless device. The data sent from the service node will be referred to as "application data" and data transmitted from the base station will be referred to as "downlink data" which thus comprises the application data.

It has been recognized that by using a service node that is located relatively close to the wireless device, any latency and delays in the service delivery can be reduced basically by making the communication path as short as possible, as compared to using a central server that could be located anywhere on the Internet. As the application data becomes available at the service node, the data is placed in a queue referred to as an application buffer from which the data is sent towards the base station in suitable packets or the like. Typically, the data is kept in the application buffer until an acknowledgement is received from the wireless device which confirms that the data, e.g. in a data packet, has been received correctly. If no such positive acknowledgement is received the data may have to be resent which may be repeated until the required acknowledgement is received, or until a timeout expires which may indicate that the data has become "out of date", i.e. more or less useless to the wireless device.

The above-described service node may be implemented in a "cloud-like" environment meaning that resources for processing, storing and communication of data are basically hired and used temporarily for the service delivery. When the service session is finished, the used resources in the service node are released and become available for other services and devices, which is well known in the field of cloud computing. Multiple such service clouds or service nodes may be deployed locally, e.g. at the base stations themselves, sometimes referred to as "Local Service Clouds", LSCs. This way, a dedicated communication link can be used between the service node and the serving base station to minimize the latency and delays. The downlink data is typically communicated according to a Packet Data Convergence Protocol, PDCP, and/or a Radio Link Control, RLC, protocol, e.g. when Long Term Evolution LTE is employed. Still, some delay will occur since the data is first buffered in the service node's application buffer, e.g. a Transmission Control Protocol/Internet Protocol (TCP/IP) buffer, and then in a downlink buffer in the base station, e.g. a PDCP buffer, before it is finally transmitted to the wireless device. Each buffering causes delay before the data can finally reach the wireless device.

To enable mobility during an ongoing service session, the wireless device may need to be handed over from one base station to another base station which are connected to different service nodes, e.g. LSC service nodes. This requires also that the service session is transferred from one corresponding source node to another, which is illustrated in FIG. 1.

In this example, a wireless device 100 is initially served by a first base station 102 to which a service node 104 is connected that provides the service session for the wireless device 100, here denoted LSC source service node 104. A service application, APP, is thus executed in the source service node 104 for the wireless device 100 by means of the ongoing service session involving transmission of application data from the service application to the wireless device 100. At some point during the service session, the wireless device 100 is handed over from base station 102 to a second base station 106 to which another service node 108 is connected, here denoted LSC target service node 108.

In order to retain a short communication path for the data, the service session needs to be transferred from the source service node 104 to the target service node 108 as well, which is done by transferring application data that is pending in the source service node 104 to the target service node 108, e.g. over an S1 interface. Thereby, the service session can be resumed and the service application, APP can be executed in the target service node 108 by sending the pending application data to the second base station 106 for transmission to the wireless device 100. In addition, the handover procedure includes transferring pending downlink data from the first base station 102 to the second base station 106, which is typically done over an X2 interface. It is generally desirable that such a handover should go unnoticed by a user of the wireless device 100, meaning that any reception of downlink data should continue in a more or less seamless manner, i.e. without noticeable delay or disturbance in the service.

However, it is a problem that the amount of data traffic generated by the above-described communication may be considerable which causes additional delays in the service and load on the network(s) involved. The transfer of application data between the service nodes is often time-consuming so that the service session may be notably disturbed and even interrupted, naturally degrading the user experience. In addition, if the session transfer is synchronized with the handover, e.g. using an application in the LSC service node 104, the delay may compromise the reliability of the handover meaning that the risk for handover failure is increased.

SUMMARY

It is an object of embodiments described herein to address at least some of the problems and issues outlined above. It is possible to achieve this object and others by using a source service node, a target service node and methods therein, as defined in the attached independent claims.

According to one aspect, a method is performed by a source service node for transferring a service session for a wireless device from the source service node to a target service node when a service application is executed in the source service node for the wireless device by means of said service session. In this method, the source service node first detects that the wireless device will be handed over from a first base station associated with the source service node to a second base station associated with the target service node.

The source service node then obtains a buffer indicator indicating an amount of downlink data pending at the first base station for the service session, and truncates application data present in an application buffer at the source service node by removing sent but unacknowledged application data from the application buffer based on the obtained buffer indicator. Finally, the source service node transfers the truncated application data and the buffer indicator to the target service node, thereby enabling the target service node to recreate said application buffer from the transferred application data and downlink data pending at the second base station corresponding to the buffer indicator.

According to another aspect, a source service node is arranged to transfer a service session for a wireless device from the source service node to a target service node when a service application is executed in the source service node for the wireless device by means of said service session. The source service node is configured to detect that the wireless device will be handed over from a first base station associated with the source service node to a second base station associated with the target service node.

The source service node is further configured to obtain a buffer indicator indicating an amount of downlink data pending at the first base station for the service session, and to truncate application data present in an application buffer at the source service node by removing sent but unacknowledged application data from the application buffer based on the obtained buffer indicator.

The source service node is also configured to transfer the truncated application data and the buffer indicator to the target service node, thereby enabling the target service node to recreate said application buffer from the transferred application data and downlink data pending at the second base station corresponding to the buffer indicator.

According to another aspect, a method is performed by a target service node for transferring a service session for a wireless device from a source service node to the target service node when a service application is executed in the source service node for the wireless device by means of said service session. In this method, the target service node detects that the wireless device will be handed over from a first base station associated with the source service node to a second base station associated with the target service node.

The target service node further receives from the source service node truncated application data from an application buffer at the source service node and a buffer indicator indicating that sent but unacknowledged application data has been removed from the application buffer. The target service node then obtains pending downlink data from the second base station based on the received buffer indicator, and recreates the application buffer from the truncated application data and the downlink data obtained from the second base station. The target service node is then able to resume the service session by sending application data from the recreated application buffer to the second base station for transmission to the wireless device.

According to another aspect, a target service node is arranged to transfer a service session for a wireless device from a source service node to the target service node when a service application is executed in the source service node for the wireless device by means of said service session. The target service node is configured to detect that the wireless device will be handed over from a first base station associated with the source service node to a second base station associated with the target service node.

The target service node is further configured to receive, from the source service node, truncated application data from an application buffer at the source service node and a buffer indicator indicating that sent but unacknowledged application data has been removed from the application buffer. The target service node is also configured to obtain pending downlink data from the second base station based on the received buffer indicator, and to recreate the application buffer from the truncated application data and the downlink data obtained from the second base station. The target service node is further configured to resume the service session by sending application data from the recreated application buffer to the second base station for transmission to the wireless device.

The above methods and nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce the amount of data that needs to be transferred from a source service node to a target service node in order to maintain a service session for a wireless device that is handed over from a first base station associated with the source service node to a second base station associated with the target service node. This can be achieved by truncating the pending application data when transferred from the source service node, by an amount corresponding to the data pending in a downlink buffer at the first base station. Thereby, the target service node is able to recreate the complete application buffer from the received truncated application data and data from the downlink buffer, the latter data being transferred from the first base station to the second base station anyway according to regular handover procedures. The amount of application data to transfer is thus reduced by the above truncation, thereby also reducing any delays in the service caused by this migration of application data as well as reducing the load on the network.

As indicated above, the term "application data" is used herein to generally denote any data or information that is communicated from a service node to a wireless device when a service is executed for the wireless device by the service node. Other suitable terms that could be used in this description instead of application data may include "session data", "service data" and "application context data". For example, the application data may include data associated with the service session itself and data associated with a user context. As already mentioned above, data transmitted from the base station to the wireless device over radio is referred to as "downlink data".

The solution will be described herein basically in the context of LTE and using associated terminology. However, the solution is applicable also in other mobile communication systems, e.g. evolved LTE versions and/or 5G systems, such as the 5G system currently being standardized by 3GPP. In 3GPP's future 5G system the radio access network is referred to as "New Radio" (NR) and the core network may be either the "Evolved Packet Core" (EPC) or a new core network referred to as "Next Generation Core" (NGC). The NR entity corresponding to a base station denoted eNodeB in LTE, e.g. a radio base station, would be referred to as gNB.

Figure 1:
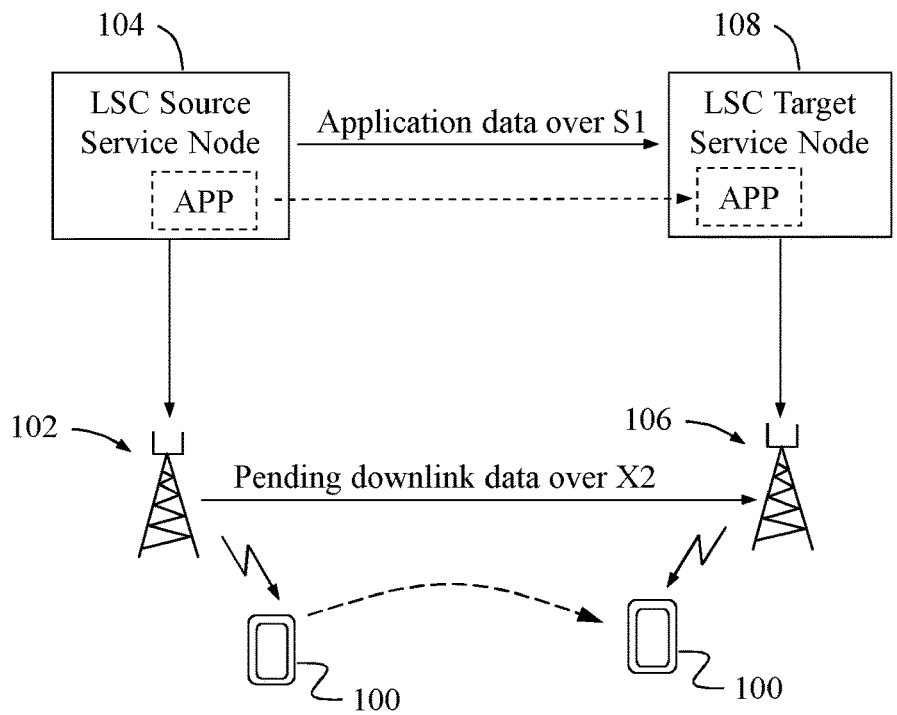
FIG. 1 is a communication scenario illustrating how a service session is transferred from one service node to another, according to the prior art.

It was described above with reference to FIG. 1 that when such a handover and migration of an ongoing service session is made in a conventional procedure, all pending application data needs to be transferred from the source service node to the target service node in order to get it to the wireless device, which may cause considerable delay and disturbance in the service. Further, if the session migration is synchronized with the handover, which is often the case e.g. when Long Term Evolution LTE is employed, this delay may compromise the reliability of the handover, meaning that the risk for handover failure increases and may become significant.

An example of a procedure where the above reduction of transferred application data may be accomplished will now be described with reference to the scenario in FIG. 2 involving a source service node 200, a target service node 202 and a wireless device 204 which makes a handover from a first base station 206 associated with the source service node 200 to a second base station 208 associated with the target service node 202. Alternatively, the first base station 206 may be denoted a source base station and the second base station 208 may be denoted a target base station.

When detecting that the wireless device 204 is about to be handed over, the source service node 200 obtains a buffer indicator "M" from the first base station 206, in an action 2:1, where M indicates an amount of downlink data pending in a PDCP buffer 206A at the first base station 206 for the service session. For example, M may indicate a number of bytes or a number of IP (Internet Protocol) packets pending in the PDCP buffer 206A. Here, the PDCP buffer is a non-limiting example of a downlink buffer, although the solution and embodiments described herein are applicable regardless of which protocol is used for the downlink radio communication with device 204.

The pending downlink data in the PDCP buffer 206A typically comprises both data that has not yet been transmitted from the base station 206 and data that has been transmitted but is not yet acknowledged by the wireless device 204. The latter data is kept in the PDCP buffer 206A in case no positive acknowledgment of reception is received from the device and therefore may need to be retransmitted. As mentioned above, any transmitted data is removed from the PDCP buffer 206A once a positive acknowledgment is received for that data, or when a timeout expires for the data indicating that it has become out of date.

In the same manner, application data pending in an application buffer at the source service node 200, e.g. a TCP buffer, likewise comprises both data that has not yet been dispatched to the base station 206 and data that has been dispatched but is not yet acknowledged by the wireless device 204. The latter dispatched (i.e. sent) data may need to be sent again in case no acknowledgment of reception is received from the device 204, which is therefore kept in the application buffer until a positive acknowledgment is received or a timeout expires. Hence, buffer control based on acknowledgements of received data is typically implemented on two levels, the application level at the service node and the radio transport level at the base station.

In a next action 2:2, the source service node 200 truncates the application data in an application buffer 200A at the source service node 200, based on the obtained buffer indicator M, which means that any sent but unacknowledged application data corresponding to M is removed from the application data in the application buffer 200A. It is thus assumed in this solution that this data corresponding to M can be safely omitted in the transfer of application data by knowing that the same data will be transferred between the base stations 206, 208 and will thus be available for downlink transmission from the second base station 208. In other words, the data corresponding to M is thus redundant in the application buffer 200A and therefore not necessary to transfer on the application level in addition to the downlink data.

In a further action 2:3, the source service node 200 then transfers the truncated application data together with the buffer indicator M to the target service node 202, which means the amount of data to transfer is considerably reduced as compared to the entire application buffer 200A before truncation. In parallel thereto, the downlink data pending in the PDCP buffer 206A at the first base station 206 is transferred to the second base station 208 to which the wireless device 208 will be handed over, as shown in an action 2:4. It can thus be said that the entire PDCP buffer 206A is transferred from the first base station 206 to form a corresponding PDCP buffer 208A at the second base station 208. The latter transfer of downlink data from a source base station to a target base station is customarily performed according to regular handover procedures.

The truncated application data transferred in action 2:3 may basically comprise pending data that has not yet been sent from the source service node 200 and possibly also some data that has been sent but not yet acknowledged although the amount of such sent and unacknowledged data has been significantly reduced by the above truncation. Thereby, it is possible to avoid communication of redundant data, i.e. the same data twice namely both between the service nodes 200, 202 and between the base stations 206, 208.

Having received the truncated application data and the buffer indicator M in action 2:3, the target service node 202 is able to operate as follows. A next action 2:5 indicates that the target service node 202 obtains, i.e. "fetches", pending downlink data from the second base station's 208 downlink buffer, which corresponds to the received buffer indicator M. In a final action 2:6, the target service node 202 accordingly recreates the application buffer 200A from the truncated application data 202A received from the target service node 202 and the downlink data 202B obtained from the second base station 208.

As an alternative to use the PDCP layer as described above, the application data at the TCP/IP layer yet to be acknowledged by the wireless device 204 may be buffered also in the RLC layer at the first base station 206. In this embodiment, the source service node 200 will retrieve the buffer indicator M and data from the RLC layer instead of from the PDCP layer.

An example will now be described, with reference to the flow chart in FIG. 3, of how the solution may be employed in terms of actions which may be performed by a source service node such as the above-mentioned source service node 200. Some optional example embodiments that could be used in this procedure will also be described below. Reference will also be made, without limiting the described features and embodiments, to the example scenario of FIG. 2. This procedure may be employed in a wireless network which may be of any type and any suitable protocols and standards for communication may be employed in this network.

The source service node 200 in this procedure is arranged to transfer a service session for a wireless device 204 from the source service node 200 to a target service node 202 when a service application is executed in the source service node 200 for the wireless device 204 by means of said service session. In this service session, executing the service application means that the wireless device 204 receives a data flow. For example, in radio communication between base stations and the wireless device 204, the PDCP and/or the RLC protocol may be used.

A first action 300 illustrates that the source service node 200 detects that the wireless device 204 will be handed over from a first base station 206 associated with the source service node 200 to a second base station 208 associated with the target service node 202. This detection may be achieved by receiving a suitable handover notification or the like from the first base station 206. Generally, a serving base station typically detects a trigger for handover, e.g. based on measurement reports from the wireless device referring to radio channel quality in one or more neighboring cells/base stations and the current cell/base station. The base station then in turn notifies the service node.

In a next action 302, the source service node 200 obtains a buffer indicator M indicating an amount of downlink data pending at the first base station 206 for the service session, which corresponds to action 2:1 above. As mentioned above, the pending downlink data may include not yet transmitted downlink data and transmitted but unacknowledged downlink data. This action may be performed by requesting, from the first base station 206, an indication of the amount of data in a PDCP buffer 206A that a PDCP entity in base station 206 has received from the source service node 200 for the data flow.

In a following action 304, the source service node 200 truncates application data present in an application buffer 200A at the source service node 200, by removing sent but unacknowledged application data from the application buffer 200A based on the obtained buffer indicator M. Thereby, the size of the application buffer 200A is significantly reduced by omitting data that will be transferred between the base stations in the handover procedure. This action 304 corresponds to action 2:2 above. For example, the "Sent but Unacknowledged" buffer in the source service node 200 may be truncated by the amount of data in the PDCP buffer 206A of the base station 206. If the service session involves multiple data flows, the truncation may be performed for all data flows, e.g. jointly in a single integrated operation. Further, the truncation should be done on a latter part of the buffer, i.e. the most recent of the data in the buffer, which will be described in more detail further below.

A final action 306 illustrates that the source service node 200 transfers the truncated application data and the buffer indicator M to the target service node 202, which corresponds to action 2:3 above. Thereby, the target service node 202 is enabled to recreate the complete application buffer 200A from the transferred application data and downlink data pending at the second base station 208 corresponding to the buffer indicator M. In other words, the application buffer 200A can be recreated by adding the pending downlink data to the truncated application data. An example of how this could be done will be described in more detail with reference to FIG. 5 below. If the service session involves multiple data flows, the transfer of truncated application data and the buffer indicator M to the target service node 202 may include truncated data for all data flows together, e.g. jointly in a single integrated operation.

Figure 3:
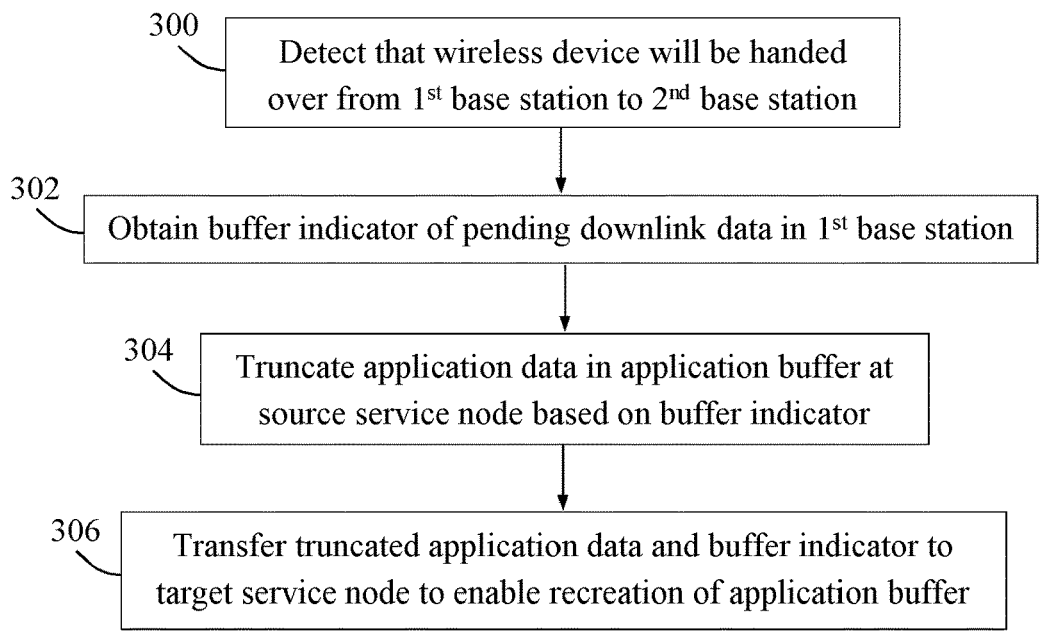
FIG. 3 is a flow chart illustrating a procedure in a source service node, according to further possible embodiments.

Some further embodiments and examples of how the above procedure in FIG. 3 may be realized, will now be outlined. In one example embodiment, the truncated application data may, as mentioned above, comprise application data that has not yet been sent from the source service node 200 and application data that has been sent from the source service node 200 but not yet acknowledged by the wireless device 204. In another example embodiment, said truncating may in that case comprise removing new application data based on M and keeping old application data that has been sent earlier than the removed new application data. This embodiment is basically applied in FIG. 5 to be described below. The terms "new" and "old" application data are used in the sense that the new application data has been generated or obtained more recently than the old application data.

In another example embodiment, the pending downlink data at the first base station 206 may, as likewise mentioned above, comprise downlink data that has not yet been transmitted to the wireless device 204 and downlink data that has been transmitted to the wireless device 204 but is not yet acknowledged. In further example embodiments, the buffer indicator M may indicate a number of bytes or a number of IP packets pending at the first base station 206 for the service session.

In another example embodiment, the service session may involve multiple data flows from the service application to the wireless device 204, and in that case the above-described procedure in FIG. 3 may be performed per data flow. In further example embodiments, the application buffer 200A at the source service node 200 may be a TCP buffer and the downlink data may be communicated according to a Packet Data Convergence Protocol, PDCP, and/or a Radio Link Control, RLC, protocol. In another example embodiment, the source service node 200 may be deployed as an LSC which may have a dedicated communication link to the first base station 206.

An example will now be described, with reference to the flow chart in FIG. 4, of how the solution can be employed in terms of actions performed in a target service node, such as the above-described target service node 202, when a source service node basically operates according to the procedure of FIG. 3. Reference will again be made, without limiting the features described, to the example scenario shown in FIG. 2. The target service node 202 in this procedure is operative for transferring a service session for a wireless device 204 from a source service node 200 to the target service node 202 when a service application is executed in the source service node 200 for the wireless device 204 by means of said service session.

A first action 400 illustrates that the target service node 202 detects that the wireless device 204 will be handed over from a first base station 206 associated with the source service node 200 to a second base station 208 associated with the target service node 202. Similar to action 300 of FIG. 3 above, this detection may be achieved by receiving a suitable handover notification or the like from the second base station 208.

In a next action 402, the target service node 202 receives from the source service node 200 truncated application data from an application buffer 200A at the source service node 200 and a buffer indicator M indicating that sent but unacknowledged application data has been removed from the application buffer 200A. This action thus corresponds to action 2:3 in FIG. 2. It was described above for FIG. 3 how M was created and sent by the source service node 200. The buffer indicator M thus indicates how much downlink data is pending at the first base station 206 for the service session, and this downlink data will anyway be transferred to the second base station 208 for subsequent transmission therefrom to the wireless device 204. Thereby, it is not necessary to transfer that data from service node 200 to service node 202 since it will be available from the downlink buffer at the second base station 208, as explained above.

Figure 2:
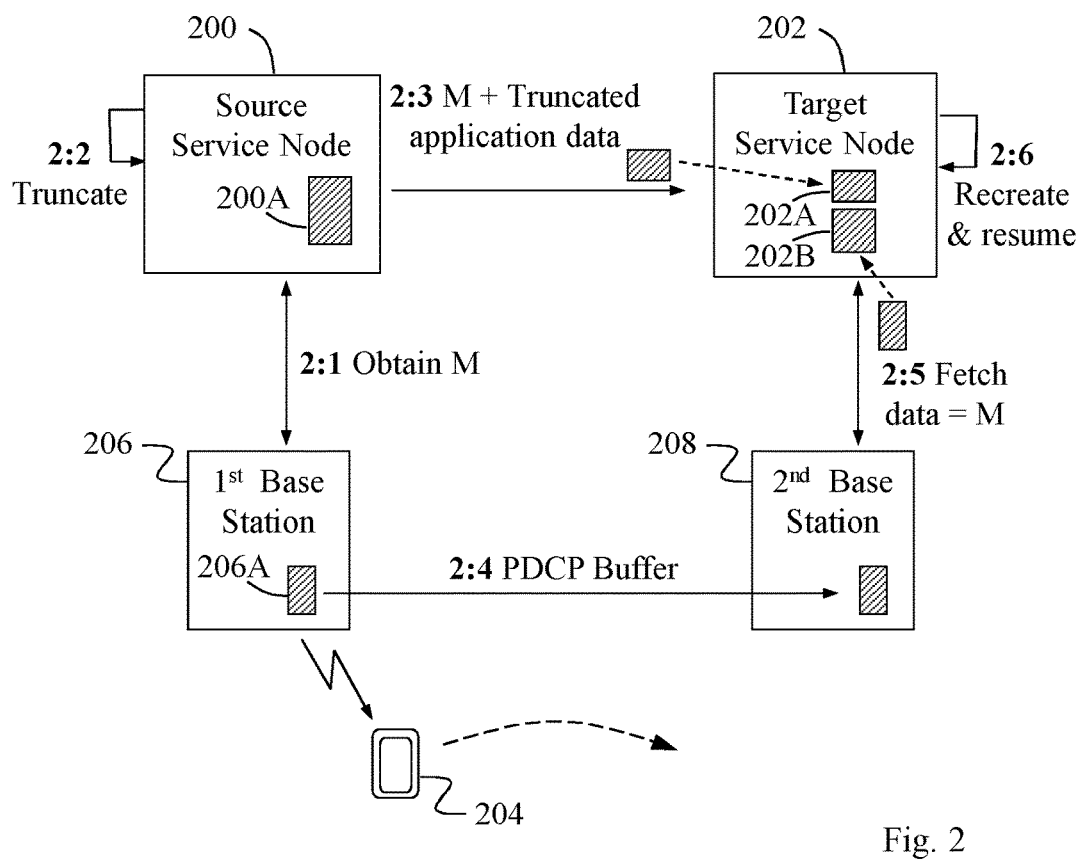
FIG. 2 is a communication scenario illustrating an example of how the solution may be employed for transferring a service session, according to some possible embodiments.

In a further action 404, the target service node 202 obtains pending downlink data from the second base station 208 based on the received buffer indicator M, which corresponds to action 2:5 in FIG. 2. The data pending in the downlink buffer in the second base station 208 has been transferred from the downlink buffer in the first base station 206 which thus includes the redundant data that was removed from the application buffer in the truncation. Another option may be that the target service node 202 could request the entire downlink buffer content for the wireless device 204 from the second base station 208, and identify the missing data that has been removed in the truncated application data, as indicated by M. As a result, the target service node 202 can recreate the application buffer from the received truncated application data and the downlink data obtained from the second base station 208 according to M, as shown in an action 406.

A final action 408 illustrates that the target service node 202 resumes the service session by sending application data from the recreated application buffer to the second base station 208 for transmission to the wireless device 204. Actions 406 and 408 correspond to action 2:6 in FIG. 2. If the service session involves multiple data flows, the obtaining of pending downlink data and recreation of the application buffer may be performed for all data flows together, e.g. jointly in a single integrated operation.

Figure 4:
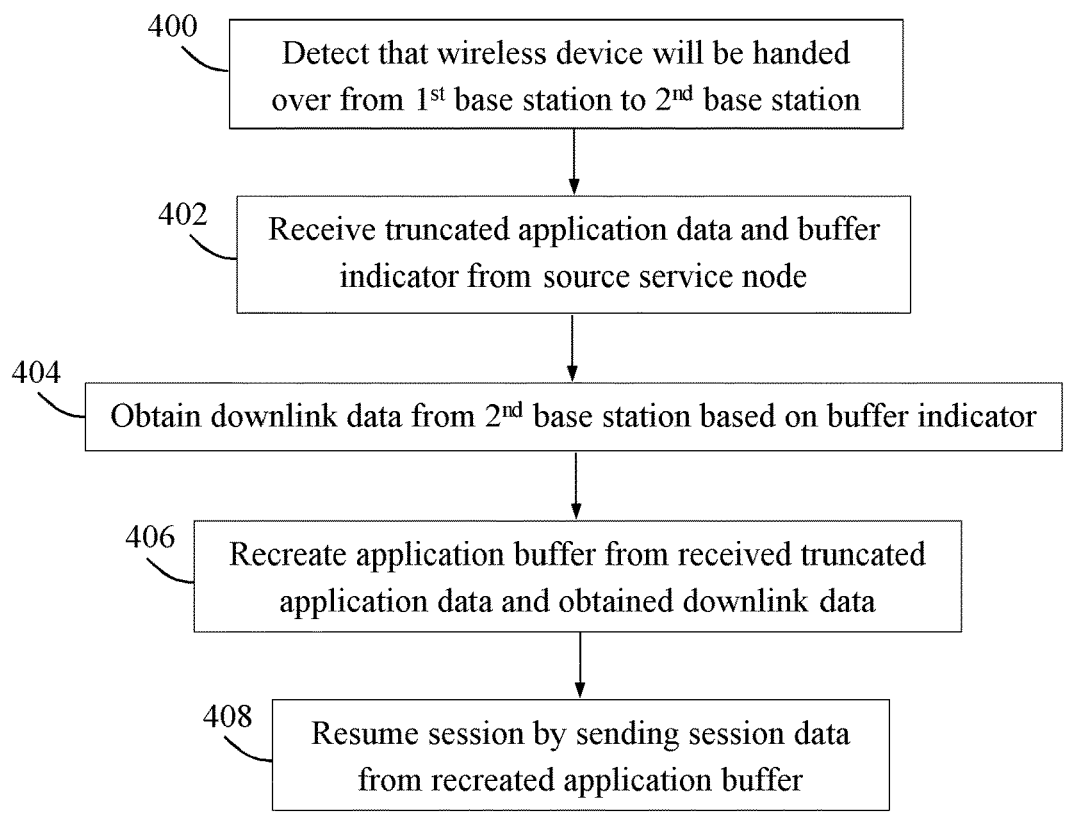
FIG. 4 is a flow chart illustrating a procedure in a target service node, according to further possible embodiments.

Some further embodiments and examples of how the above procedure in FIG. 4 may be realized will now be further outlined. In one example embodiment, the received truncated application data may comprise application data that has not yet been sent from the source service node 200 and application data that has been sent from the source service node 200 but not yet acknowledged by the wireless device 204. It is thus the sent and unacknowledged data that has been truncated.

The not yet sent data will be included in the application buffer at the target service node 202 for subsequent transmission from the second base station 208 to the wireless device 204. Any sent and unacknowledged data will also be included in the recreated application buffer at the target service node 202 since it may need to be retransmitted to the wireless device 204 in case no acknowledgement is received therefrom.

In another example embodiment, recreating the application buffer may comprise inserting the obtained downlink data between the sent and unacknowledged application data and the not yet sent application data. This embodiment assumes that in said truncating the source service node 200 has removed new application data and kept old application data, as described above. Thereby, the obtained downlink data corresponds to the removed new application data which accordingly should be placed "earlier" than the not yet sent application data but "later" than the kept old application data.

In further example embodiments, the buffer indicator M may indicate a number of bytes or a number of IP packets pending at the second base station 208 for the service session. In another example embodiment, the service session may involve multiple data flows from the service application to the wireless device 204, and in that case the procedure of FIG. 4 may be performed per data flow.

In further example embodiments, the recreated application buffer at the target service node 202 may be a TCP buffer and the downlink data may be communicated according to a PDCP and/or an RLC protocol. In another example embodiment, the target service node 202 may, similar to the source service node 200, be deployed as an LSC having a dedicated communication link to the second base station 208.

It was mentioned above that the source service node 200 may truncate the application buffer 200A by removing new application data and keeping old application data, and that the target service node 202 is then able to recreate the application buffer by inserting the obtained downlink data between the sent and unacknowledged application data and the not yet sent application data. An example of how this can be implemented will now be described in more detail with reference to the diagram in FIG. 5, and occasionally also with reference to the nodes and elements illustrated in FIG. 2.

Figure 5:
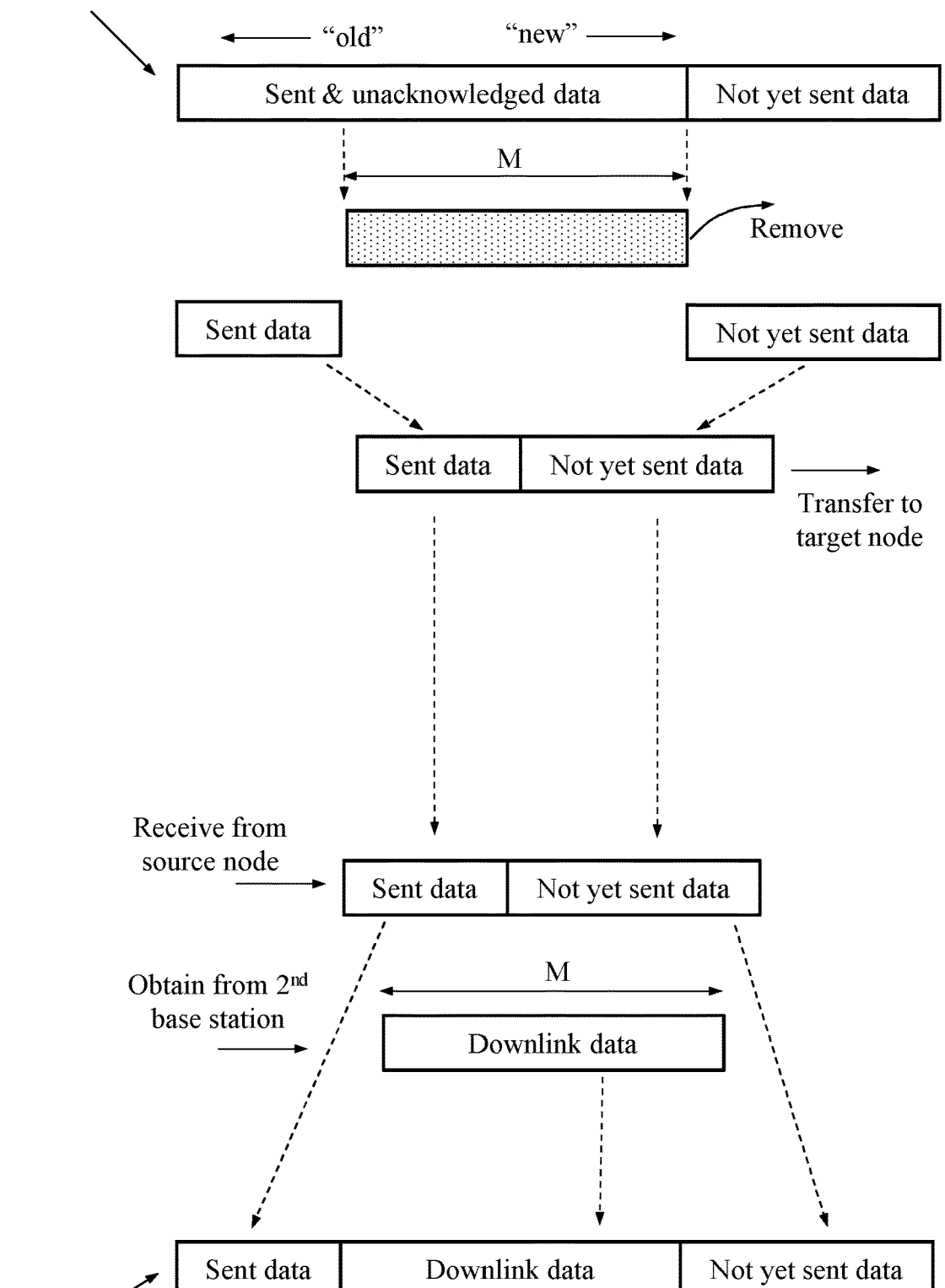
FIG. 5 is a diagram illustrating how an application buffer can be recreated when the solution is used, according to further possible embodiments.

At the top of FIG. 5, the application buffer 200A at the source service node 200 is comprised of sent and unacknowledged application data and not yet sent application data. In this application buffer, old data is indicated to the left while new data is indicated to the right so that the buffer is built by adding the latest generated data on the right side of the buffer. The above-described truncation of action 304 is made by removing at least a part of the sent and unacknowledged application data from the application buffer 200A, which corresponds to the data indicated by the buffer indicator M, i.e. the latest or most recent "new" data, which will thus be available from the downlink buffer. The remaining sent data and the not yet sent data are then transferred from the source service node 200 to the target service node 202, in the manner described above for action 306.

The above-described recreation of the application buffer 200A as of actions 404, 406 is then made at the target service node 202 by obtaining downlink data, e.g. from a PDCP buffer 208A, corresponding to M from the second base station 208, and inserting the obtained downlink data between the received sent application data and not yet sent application data, as illustrated at the bottom of FIG. 5. Thereby, the data in the application buffer 200A at the target service node 202 will come in the same order as it was at the source service node 200.

Figure 6:
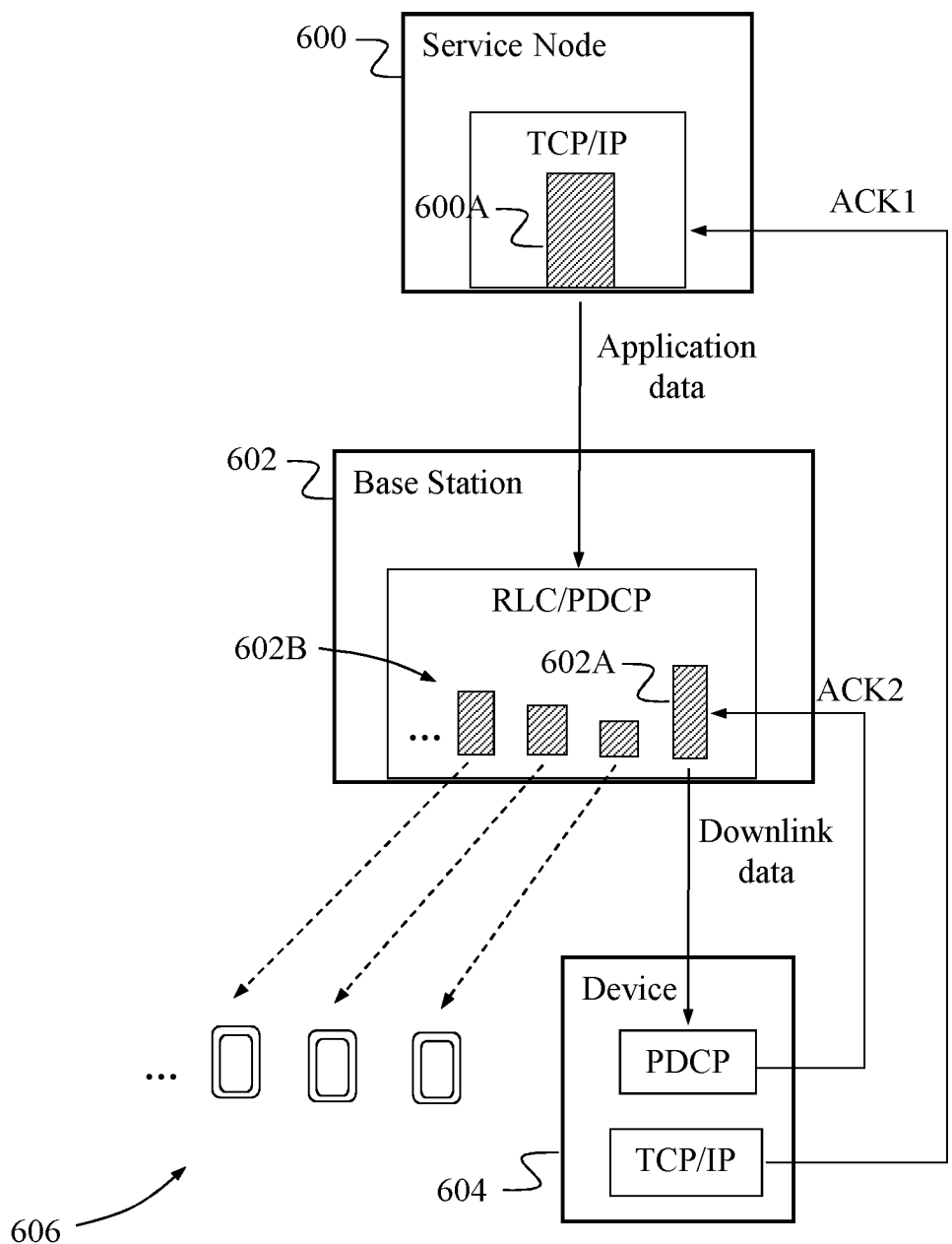
FIG. 6 is a block diagram illustrating how a service node and a base station may operate when the solution is used, according to further possible embodiments.

An example of how a service node and a base station may generally operate when the solution is used, will now be briefly outlined with reference to the block diagram FIG. 6. The service node 600 may be either of the above-described source and target service nodes 200, 202, while the base station 602 may be either of the above-described first and second base stations 206, 208, respectively. The service node 600 generates or otherwise obtains application data for a wireless device 604 which data is kept in an application buffer 600A. In this example, the TCP/IP protocol is used in the communication of application data from the service node 600.

The application data in the buffer 600A is gradually sent to the base station 602 for subsequent wireless transmission to device 604 according to regular procedures. In the base station 602, the received application data is arranged in a downlink buffer 602A to be gradually transmitted in the form of downlink data to the wireless device 604. FIG. 6 illustrates that the base station 602 may maintain multiple such downlink buffers for a plurality of corresponding wireless devices 606. In this example, the PDCP protocol is used in the communication of downlink data from the base station 602.

The wireless device 604 employs a feedback mechanism on two levels, including the PDCP level acknowledging correct reception of downlink data, "ACK1", from the base station 602, and the TCP/IP level acknowledging correct reception of application data, "ACK2", from the service node 600. As said above, the data needs to be kept in either buffer 600A, 602A until it has been sent/transmitted and positively acknowledged by the wireless device 604 through the respective feedback mechanism. The feedback mechanisms described above may be employed in any conventional manner which is somewhat outside the embodiments herein.

Figure 7:
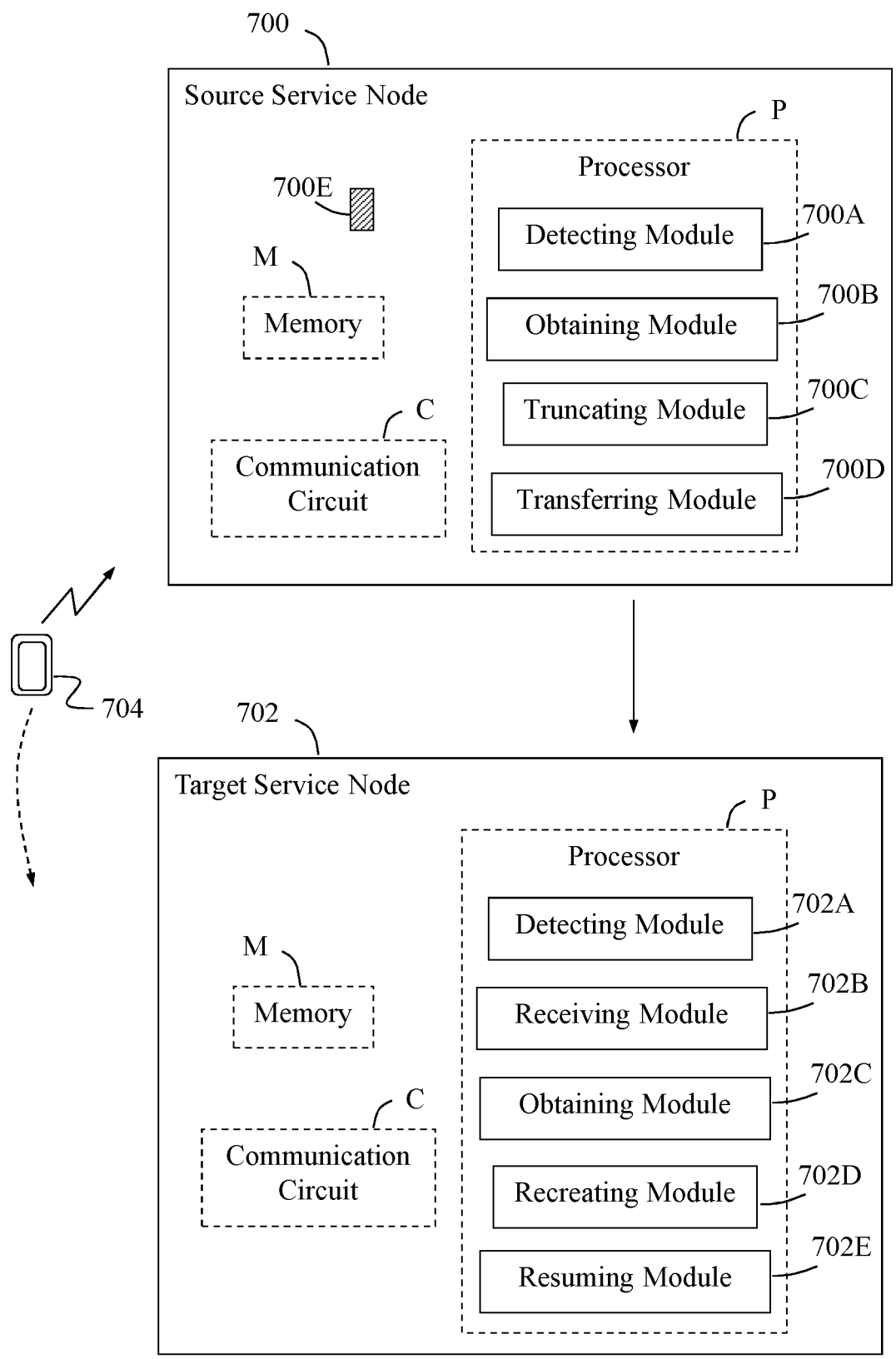
FIG. 7 is a block diagram illustrating a source service node and a target service node in more detail, according to further possible embodiments.

The block diagram in FIG. 7 illustrates a detailed but non-limiting example of how a source service node 700 and a target service node 702, respectively, may be structured to bring about the above-described solution and embodiments thereof. In this figure, the source service node 700 and the target service node 702 may be configured to operate according to any of the examples and embodiments of employing the solution as described herein, where appropriate. Each of the source service node 700 and the target service node 702 is shown to comprise a processor "P", a memory "M" and a communication circuit "C" with suitable equipment for sending and receiving data and information in the manner described herein.

The communication circuit C in each of the source service node 700 and the target service node 702 thus comprises equipment configured for communication with each other and with their associated base stations using suitable protocols for the communication depending on the implementation. The solution is however not limited to any specific types of messages or protocols. As a practical but non-limiting example, the data and information described herein may be communicated by means of the Hyper Text Transfer Protocol, HTTP, or the File Transfer Protocol, FTP.

The source service node 700 is, e.g. by means of modules, units or the like, configured or arranged to perform at least some of the actions of the flow chart in FIG. 3 as follows. Further, the target service node 702 is, e.g. by means of modules, units or the like, operative or arranged to perform at least some of the actions of the flow chart in FIG. 4 as follows.

The source service node 700 is arranged to transfer a service session for a wireless device 704 from the source service node 700 to a target service node 702 when a service application is executed in the source service node 700 for the wireless device 704 by means of said service session. The source service node 700 comprises a memory M and a processor P, the memory M containing instructions executable by the processor P such that the source service node 700 is operative as follows.

The source service node 700 is configured to detect that the wireless device 704 will be handed over from a first base station associated with the source service node 700 to a second base station associated with the target service node 702. This operation may be performed by a detecting module 700A in the source service node 700, as described above for action 300. The first and second base stations are not shown in this figure for simplicity.

The source service node 700 is further configured to obtain a buffer indicator M indicating an amount of downlink data pending at the first base station for the service session. This operation may be performed by an obtaining module 700B in the source service node 700, as described above for action 302. The obtaining module 700B could alternatively be named a fetching module or a retrieving module.

The source service node 700 is further configured to truncate application data present in an application buffer 700E at the source service node 700 by removing sent but unacknowledged application data from the application buffer 700E based on the obtained buffer indicator M. This operation may be performed by a truncating module 700C in the source service node 700, as described above for action 304. The truncating module 700C could alternatively be named a buffer module.

The source service node 700 is further configured to transfer the truncated application data and the buffer indicator M to the target service node 702, thereby enabling the target service node 702 to recreate said application buffer 700E from the transferred application data and downlink data pending at the second base station corresponding to the buffer indicator M. This operation may be performed by a transferring module 700D in the source service node 700, as described above for action 306. The transferring module 700D could alternatively be named a migrating module or a handover module.

The target service node 702 is arranged to transfer a service session for a wireless device 704 from a source service node 700 to the target service node 702 when a service application is executed in the source service node 700 for the wireless device 704 by means of said service session. The target service node 702 comprises a memory M and a processor P, the memory M containing instructions executable by the processor P such that the target service node 702 is operative as follows.

The target service node 702 is configured to detect that the wireless device 704 will be handed over from a first base station associated with the source service node 700 to a second base station associated with the target service node 702. This operation may be performed by a detecting module 702A in the target service node 702, as described above for action 400.

The target service node 702 is further configured to receive from the source service node 700 truncated application data from an application buffer 700E at the source service node 700 and a buffer indicator M indicating that sent but unacknowledged application data has been removed from the application buffer 700E. This operation may be performed by a receiving module 702B in the target service node 702, as described above for action 402. The receiving module 702B could alternatively be named a migrating module or a handover module.

The target service node 702 is further configured to obtain pending downlink data from the second base station based on the received buffer indicator M. This operation may be performed by an obtaining module 702C in the target service node 702, as described above for action 404. The obtaining module 702C could alternatively be named a fetching module or a retrieving module.

The target service node 702 is further configured to recreate the application buffer from the truncated application data and the downlink data obtained from the second base station. This operation may be performed by a recreating module 702D in the target service node 702, as described above for action 406. The recreating module 702D could alternatively be named a buffer module.

The target service node 702 is further configured to resume the service session by sending application data from the recreated application buffer to the second base station for transmission to the wireless device 704. This operation may be performed by a resuming module 702E in the target service node 702, as described above for action 408. The resuming module 702E could alternatively be named a session module.

Figure 7A:
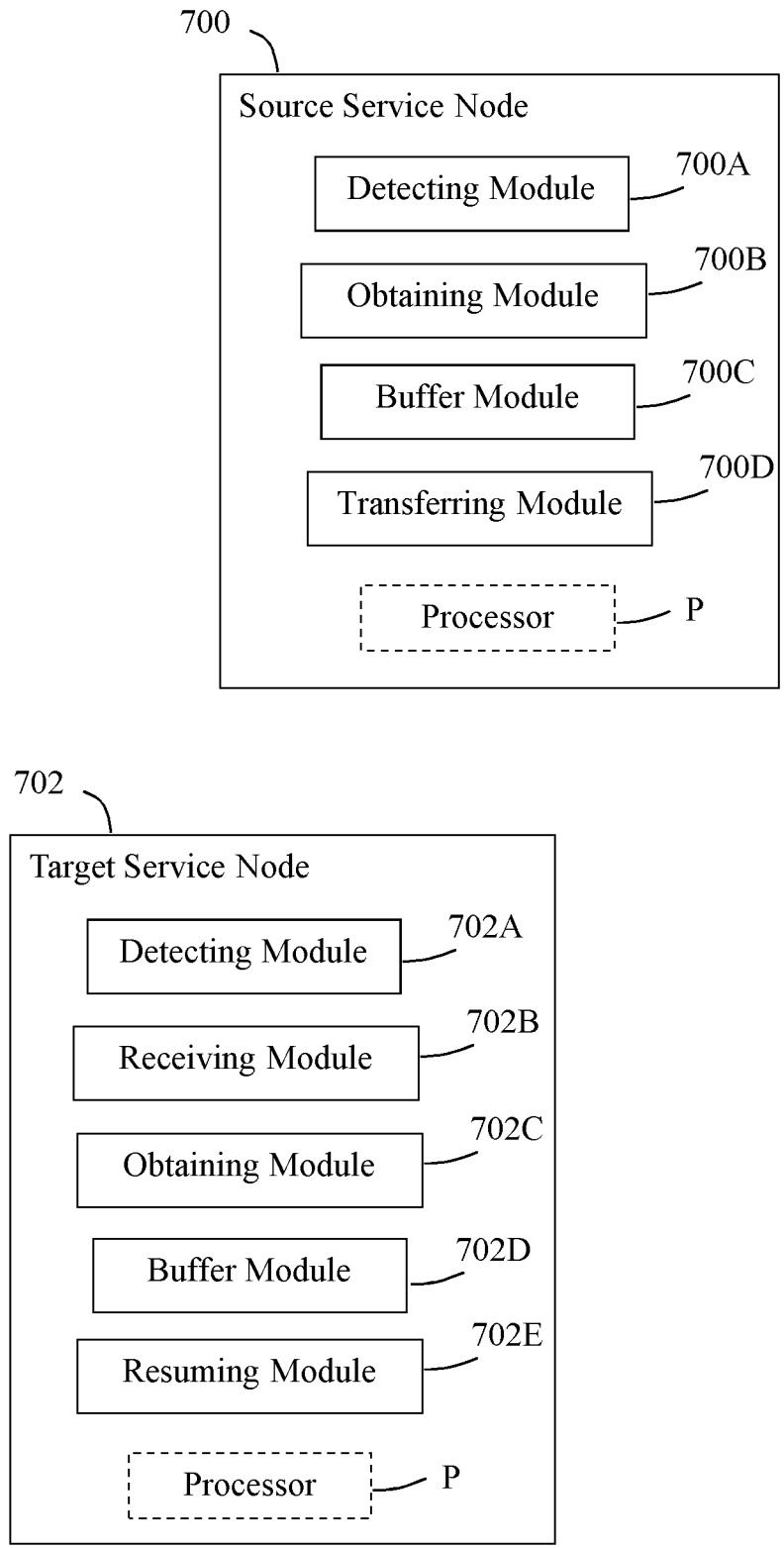
FIG. 7A is a block diagram illustrating another example of how a source service node and a target service node may be configured, according to further possible embodiments.

Another example of how the source service node 700 and the target service node 702 may be configured is schematically shown in the block diagram of FIG. 7A. In this example, the first network node 700 comprises the functional modules 700A-700D and a processor P, the modules 700A-700E being configured to operate in the manner described above with reference to FIGS. 2 and 3. Further, the target service node 702 comprises the functional modules 702A-702B and a processor P, the modules 702A-702B being configured to operate in the manner described above with reference to FIGS. 2 and 4.

It should be noted that FIGS. 7 and 7A illustrate various functional modules in the source service node 700 and the target service node 702, respectively, and the skilled person is able to implement these functional modules in practice using suitable software and hardware equipment. Thus, the solution is generally not limited to the shown structures of the source service node 700 and the target service node 702, and the functional modules therein may be configured to operate according to any of the features, examples and embodiments described in this disclosure, where appropriate.

The functional modules 700A-D and 702A-B described above may be implemented in the source service node 700 and the target service node 702, respectively, by means of program modules of a respective computer program comprising code means which, when run by the processor P causes the source service node 700 and the target service node 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the source service node 700 and the target service node 702 in the form of a memory having a computer readable medium and being connected to the processor P. The computer program product or memory M in each of the source service node 700 and the target service node 702 thus comprises a computer readable medium on which the computer program is stored e.g. in the form of computer program modules or the like. For example, the memory M in each node 700, 702 may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective source service node 700 and target service node 702.

The solution described herein may be implemented in each of the source service node 700 and the target service node 702 by a computer program comprising instructions which, when executed on at least one processor, cause the at least one processor to carry out the actions according to any of the above embodiments and examples, where appropriate. The solution may also be implemented at each of the source service node 700 and the target service node 702 in a computer readable storage medium comprising instructions which, when executed on the source service node 700 and the target service node 702, cause the source service node 700 and the target service node 702 to carry out the actions according to the above respective embodiments, where appropriate.

Some further examples of how the above-described solution and embodiments may be implemented in practice, will now be outlined.

The PDCP protocol delivers packets to the RLC protocol which is responsible for reliable, in sequence delivery of packets between a base station, or eNodeB, and wireless devices. As part of its functionality, RLC employs a selective retransmission based mechanism for reliable transfer of data to the wireless device, generally referred to as ARQ, which implies use of buffers to store packets until they have been reliably transmitted, i.e. acknowledged by the device.

When a wireless device is handed over from one base station to another, the contents of the buffer in PDCP related to the wireless device also needs to be transferred between the base stations to ensure continuity of the PDCP protocol.

The transfer of the PDCP buffers, among other things, is typically done over the X2 interface between the two base stations involved.

The data in the PDCP buffers are a subset of data in the TCP buffers of the service node, or LSC, where the application hosting the service session is located. When a wireless device moves from one base station to another, the service context along with TCP buffers and the PDCP buffer have to be migrated as well to ensure continuity in the service for the wireless device.

By employing one or more of the embodiments herein, it may be possible to optimize the amount of data to be transferred between base stations and service nodes when a wireless device moves from one base station to another.

To enable this optimization it has thus been realized that some data is duplicated in the TCP buffers (i.e. from the sent-unacknowledged part as described above) and the PDCP buffer, i.e. redundant data is migrated when the complete TCP/IP and PDCP buffers are transferred.

The above-described solution for buffer optimization can be triggered when a wireless device needs to be handed over from one base station to another such that transfer of service sessions for the wireless device in the service node is required.

It was mentioned above that a service session may involve multiple data flows from the service application to the wireless device. Also, several data flows may be handled for multiple wireless devices in parallel, as shown in FIG. 6. The following details may further be useful to consider in the above-described solution and its embodiments:

- A PDCP component of the base station may be used to identify individual data flows that belong to a wireless device and it is helpful to maintain a counter to the amount of buffer data related to each flow that is handled by means of the PDCP buffers. In this context a flow may be associated with a bearer, e.g. a so-called Evolved Packet System, EPS, bearer and/or a radio bearer.
- The base station should be able to provide an interface that allows the service node to request for the amount of data in the PDCP buffer belonging to a flow.
- The above-mentioned amount of data can be calculated as one of: A) the number of bytes of user data which can be calculated based on a sequence number, B) the number of IP packets e.g. by counting the number of IP frames received from the LSC, or C) the number of TCP segments e.g. based on the TCP header boundaries inside a TCP packet.
- The base station should also be able to provide an interface from which the service node can query and obtain the PDCP (i.e. downlink) buffers belonging to a flow.
- A data flow is typically defined as a simple "5-tuple" that indicates Source IP address, Source Port, Destination IP address, Destination Port, and UE context reference. The UE context reference may be a so-called eNB UE S1AP ID, the wireless device's identifier IMSI or S-TMSI, or an internal implementation specific identifier or pointer. The flow may also be indicated by any other entity that can individually identify a data flow between service node and wireless device.

While the solution has been described with reference to specific exemplifying embodiments, the description is generally only intended to illustrate the inventive concept and should not be taken as limiting the scope of the solution. For example, the terms "source service node", "target service node", "wireless device", "base station", "service session", "application data", "application buffer", "downlink data", "downlink buffer" and "buffer indicator" have been used throughout this disclosure, although any other corresponding entities, functions, and/or parameters could also be used having the features and characteristics described here. The solution is defined by the appended claims.

The invention claimed is:

1. A method performed by a source service node for transferring a service session for a wireless device from the source service node to a target service node when a service application is executed in the source service node for the wireless device using the service session, the method comprising:
   detecting that the wireless device will be handed over from a first base station associated with the source service node to a second base station associated with the target service node,
   obtaining a buffer indicator indicating an amount of downlink data pending at the first base station for the service session,
   truncating application data present in an application buffer at the source service node by removing sent but unacknowledged application data from the application buffer based on the obtained buffer indicator, wherein the unacknowledged application data is present in a buffer of the first base station, and
   transferring the truncated application data and the buffer indicator to the target service node, thereby enabling the target service node to recreate the application buffer from the truncated application data and downlink data pending at the second base station corresponding to the buffer indicator.

2. The method according to claim 1, wherein the truncated application data comprises application data that has not yet been sent from the source service node and application data that has been sent from the source service node but not yet acknowledged by the wireless device.

3. The method according to claim 2, wherein the truncating comprises removing new application data and keeping old application data that has been sent earlier than the removed new application data.

4. The method according to claim 1, wherein the pending downlink data at the first base station comprises downlink data that has not yet been transmitted to the wireless device and downlink data that has been transmitted to the wireless device but an acknowledgement has not yet been received.

5. The method according to claim 1, wherein the buffer indicator indicates a number of bytes or a number of Internet Protocol (IP) packets pending at the first base station for the service session.

6. The method according to claim 1, wherein the service session involves multiple data flows between the service application and the wireless device, and
   wherein the method is performed per data flow of the multiple data flows.

7. The method according to claim 1, wherein the application buffer at the source service node is a Transmission Control Protocol (TCP) buffer and the downlink data is communicated according to one or more of (1) a Packet Data Convergence Protocol (PDCP) and (2) a Radio Link Control (RLC) protocol, and
   wherein the source service node is deployed as a Local Service Cloud (LSC) having a dedicated communication link to the first base station.

8. A source service node arranged to transfer a service session for a wireless device from the source service node to a target service node when a service application is executed in the source service node for the wireless device by the service session, wherein the source service node comprises:
a memory device, and
a processor, wherein the memory device includes instructions that, when executed by the processor, cause the source service node to:
detect that the wireless device will be handed over from a first base station associated with the source service node to a second base station associated with the target service node,
obtain a buffer indicator indicating an amount of downlink data pending at the first base station for the service session,
truncate application data present in an application buffer at the source service node by removing sent but unacknowledged application data from the application buffer based on the obtained buffer indicator, wherein the unacknowledged application data is present in a buffer of the first base station, and
transfer the truncated application data and the buffer indicator to the target service node, thereby enabling the target service node to recreate the application buffer from the truncated application data and downlink data pending at the second base station corresponding to the buffer indicator.

9. The source service node according to claim 8, wherein the truncated application data comprises application data that has not yet been sent from the source service node and application data that has been sent from the source service node but not yet acknowledged by the wireless device.

10. The source service node according to claim 9, wherein the source service node is configured to perform the truncating by removing new application data and keeping old application data that has been sent earlier than the removed new application data.

11. The source service node according to claim 8, wherein the pending downlink data at the first base station comprises downlink data that has not yet been transmitted to the wireless device and downlink data that has been transmitted to the wireless device but an acknowledgement has not yet been received.

12. The source service node according to claim 8, wherein the buffer indicator indicates a number of bytes or a number of Internet Protocol (IP) packets pending at the first base station for the service session.

13. The source service node according to claim 8, wherein the service session involves multiple data flows between the service application and the wireless device, and
wherein the source service node is configured to transfer the truncated application data and the buffer indicator per data flow of the multiple data flows.

14. The source service node according to claim 8, wherein the application buffer at the source service node is a Transmission Control Protocol (TCP) buffer and the downlink data is communicated according to one or more of (1) a Packet Data Convergence Protocol (PDCP) and (2) a Radio Link Control (RLC) protocol, and
wherein the source service node is arranged to be deployed as a Local Service Cloud (LSC) having a dedicated communication link to the first base station.

15. A method performed by a target service node for transferring a service session for a wireless device from a source service node to the target service node when a service application is executed in the source service node for the wireless device by the service session, the method comprising:

detecting that the wireless device will be handed over from a first base station associated with the source service node to a second base station associated with the target service node,
receiving from the source service node truncated application data from an application buffer at the source service node and a buffer indicator indicating that sent but unacknowledged application data has been removed from the application buffer, wherein the unacknowledged application data is present in a buffer of the first base station,
obtaining pending downlink data from the second base station based on the received buffer indicator,
recreating the application buffer from the truncated application data and the downlink data obtained from the second base station, and
resuming the service session by sending application data from the recreated application buffer to the second base station for transmission to the wireless device.

16. The method according to claim 15, wherein the truncated application data comprises application data that has not yet been sent from the source service node and application data that has been sent from the source service node but not yet acknowledged by the wireless device.

17. The method according to claim 16, wherein recreating the application buffer comprises inserting the obtained downlink data between the sent and unacknowledged application data and the not yet sent application data.

18. The method according to claim 15, wherein the buffer indicator indicates a number of bytes or a number of Internet Protocol (IP) packets pending at the second base station for the service session.

19. The method according to claim 15, wherein the service session involves multiple data flows from the service application to the wireless device, and
wherein the method is performed per data flow of the multiple data flows.

20. The method according to claim 15, wherein the recreated application buffer at the target service node is a Transmission Control Protocol (TCP) buffer and the downlink data is communicated according to one or more of (1) a Packet Data Convergence Protocol (PDCP) and (2) a Radio Link Control (RLC) protocol, and
wherein the target service node is deployed as a Local Service Cloud (LSC) having a dedicated communication link to the second base station.

21. A target service node arranged to transfer a service session for a wireless device from a source service node to the target service node when a service application is executed in the source service node for the wireless device by the service session, wherein the target service node comprises:
a memory device, and
a processor, wherein the memory device includes instructions that, when executed by the processor, cause the target service node to:
detect that the wireless device will be handed over from a first base station associated with the source service node to a second base station associated with the target service node,
receive from the source service node truncated application data from an application buffer at the source service node and a buffer indicator indicating that sent but unacknowledged application data has been removed from the application buffer, wherein the unacknowledged application data is present in a buffer of the first base station, obtain pending downlink data from the second base station based on the received buffer indicator, recreate the application buffer from the truncated application data and the downlink data obtained from the second base station, and resume the service session by sending application data from the recreated application buffer to the second base station for transmission to the wireless device.

22. The target service node according to claim 21, wherein the truncated application data comprises application data that has not yet been sent from the source service node and application data that has been sent from the source service node but not yet acknowledged by the wireless device.

23. The target service node according to claim 22, wherein the target service node is configured to recreate the application buffer by inserting the obtained downlink data between the sent and unacknowledged application data and the not yet sent application data.

24. The target service node according to claim 21, wherein the buffer indicator indicates a number of bytes or a number of Internet Protocol (IP) packets pending at the second base station for the service session.

25. The target service node according to claim 21, wherein the service session involves multiple data flows from the service application to the wireless device, and wherein the target service node is configured to perform said recreating and resuming per data flow of the multiple data flows.

26. The target service node according to claim 21, wherein the recreated application buffer at the target service node is a Transmission Control Protocol (TCP) buffer and the downlink data is communicated according to one or more of (1) a Packet Data Convergence Protocol (PDCP) and (2) a Radio Link Control (RLC) protocol, and wherein the target service node is arranged to be deployed as a Local Service Cloud (LSC) having a dedicated communication link to the second base station.

\* \* \* \* \*